(12) United States Patent
Williams et al.

(10) Patent No.: US 7,889,234 B2
(45) Date of Patent: Feb. 15, 2011

(54) AUTOMATIC CALIBRATION FOR CAMERA LENS DISTORTION CORRECTION

(75) Inventors: Steven A. Williams, Kokomo, IN (US); Arnab S. Dhua, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 499 days.

(21) Appl. No.: 12/008,372

(22) Filed: Jan. 10, 2008

(65) Prior Publication Data

US 2009/0180008 A1   Jul. 16, 2009

(51) Int. Cl.
*H04N 5/217*   (2006.01)
(52) U.S. Cl. .................. 348/188; 348/187; 348/180; 348/241; 348/E5.082
(58) Field of Classification Search .................. None
See application file for complete search history.

(56) References Cited

U.S. PATENT DOCUMENTS 6,785,404 B1   8/2004   Shimazaki et al.

2006/0291698 A1   12/2006   Oizumi
2008/0291447 A1 *  11/2008   Vakrat et al. .................. 356/364

FOREIGN PATENT DOCUMENTS

EP   1816869   8/2007

OTHER PUBLICATIONS

Bouguet, "Camera Calibration Toolbox for Matlab," http://www.vision.caltech.edu/bougueti/calib_doc/htmls/example.html, accessed Nov. 14, 2007.

* cited by examiner

*Primary Examiner*—David L Ometz
*Assistant Examiner*—Angel L Garces-Rivera
(74) *Attorney, Agent, or Firm*—Thomas N. Twomey

(57) ABSTRACT

A method and apparatus for providing a distortion corrected video signal. A camera is directed toward a test pattern for producing a raw video signal. An image processor is operatively connected to the camera for receiving the raw video signal. The image processor is operable to capture at least one calibration image of the test pattern using the raw video signal from the camera, analyze the at least one calibration image to provide a calibration data table, and store the calibration data table within the image processor.

5 Claims, 3 Drawing Sheets

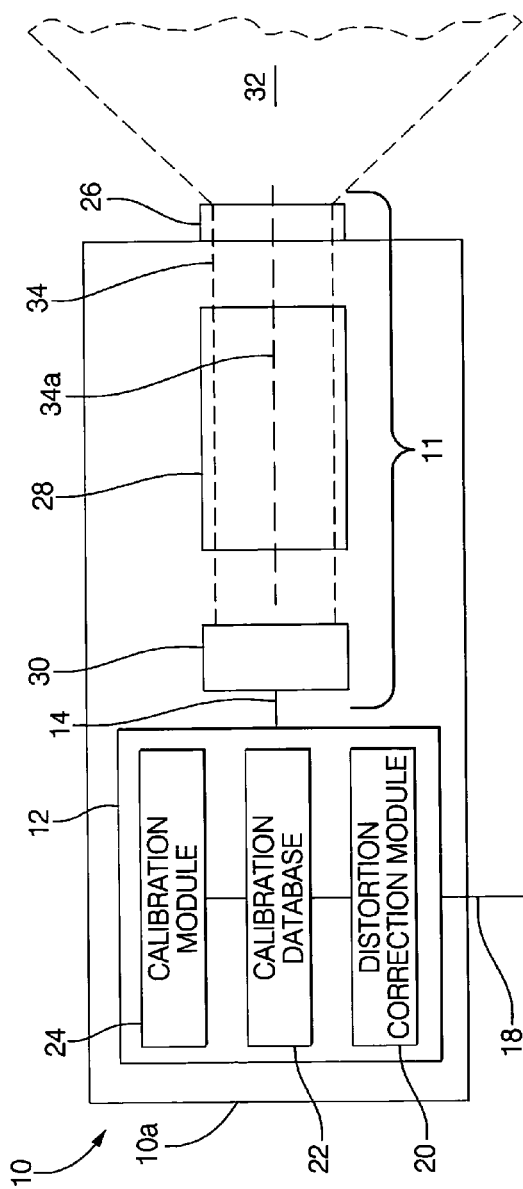

AUTOMATIC CALIBRATION FOR CAMERA LENS DISTORTION CORRECTION

FIELD OF THE INVENTION

The invention relates to the field of camera lens distortion correction.

BACKGROUND OF THE INVENTION

Application of image correction techniques to images is well known. One particular area of image correction is distortion correction, which is concerned with correcting distortions or spatial abnormalities in an image, such as stretching, warping, skewing, or rotation. The two major sources of distortion are the nature of the lens used in the camera, and manufacturing abnormalities in the camera. The nature of the lens may distort the image, for example, when a wide-angle lens is utilized, thus creating a "fish-eye" type distortion in the image, such that the portions of the image located at the sides and corners of the image appear compressed while the center of the image appears expanded. Also, manufacturing abnormalities in a particular camera may arise from misalignment of the components of the camera, or from abnormalities in a particular portion of the camera. Although manufacturing abnormalities may be reduced or eliminated by specifying precise tolerances for the camera, doing so increases production costs, which is undesirable.

Distortions may be corrected, generally speaking, by shifting or stretching an image to mitigate the distortion. However, manual distortion correction is time consuming, and is not suitable for application to a real time video signal. One way in which distortions in a real-time video image may be corrected is by applying a spatial transformation to the image using a pre-determined calibration table, which causes portions of the image to be shifted, compressed, or expanded in a pre-determined manner, often on a pixel-by-pixel basis. These systems contemplate use of a pre-determined calibration table that is produced for use with an entire family of cameras. However, use of a pre-determined calibration table that was not developed using the camera to which the calibration is being applied is only feasible if the images produced by the two cameras are substantially similar, and thus distorted in a similar manner. Otherwise, application of the distortion correction to the image could result in a further distorted image. Thus, these systems require cameras that produce images that are distorted in a substantially similar manner, thereby requiring precise manufacturing of the cameras to stringent design tolerances. Furthermore, a new calibration table must be developed to accommodate changes in the camera being used for the application.

SUMMARY

Methods and apparatuses for providing a distortion corrected video signal are taught herein. In one apparatus taught herein, at least one test pattern is provided, and a camera is directed toward the calibration for producing a raw video signal. An image processor is operatively connected to the camera for receiving the raw video signal. The image processor is operable to capture a calibration image of the test pattern using the raw video signal from the camera, analyze the at least one calibration image to provide a calibration data table, and store the calibration data table within the image processor.

The image processor is further operable to correct the raw video signal based on the calibration data table to provide a distortion corrected video signal.

One method taught herein includes the steps of providing at least one test pattern having a plurality of features disposed thereon, providing an image capture device having a camera and an image processor, capturing at least one calibration image of the test pattern using the camera, analyzing the at least one calibration image using the image processor to provide a calibration data table, and storing the calibration data table in the image processor. The method may further include the steps of generating a raw video signal using the image capture device and correcting the raw video signal using the image processor based on the calibration data table to provide a distortion corrected video signal.

BRIEF DESCRIPTION OF THE DRAWINGS

The description herein makes reference to the accompanying drawings wherein like reference numerals refer to like parts throughout several views and wherein:

FIG. 1 is a block diagram showing an image capture device;

FIG. 2 is a block diagram showing a calibration method;

DETAILED DESCRIPTION

Figure 3:
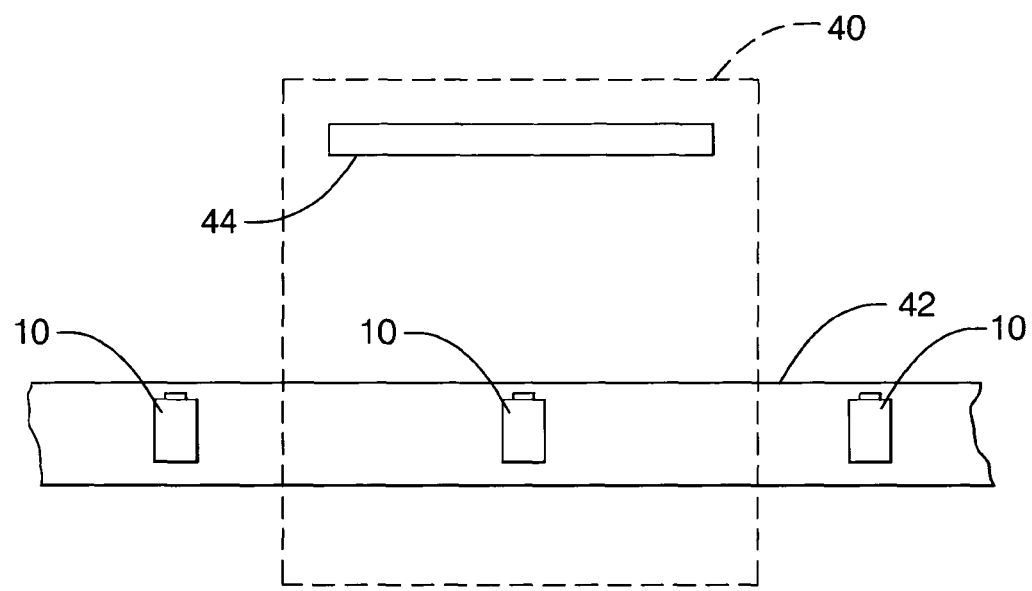
FIG. 3A is an illustration showing a calibration station having a test pattern disposed therein.
FIG. 3B is an illustration showing the test pattern.
Figure 3:
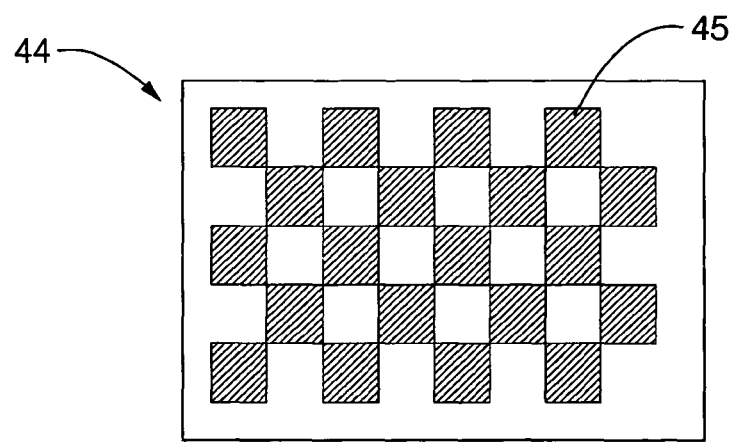

Referring to the drawings, the invention will now be described in detail with reference to the disclosed embodiment.

FIG. 1 is a block diagram showing an image capture device 10. The image capture device 10 includes a camera 11 and an image processor 12, which are disposed within a housing 10a. The camera 11 produces a raw video signal 14 that is input to the image processor 12. The image processor 12 processes the raw video signal 14 to provide a distortion corrected video signal 18 that may be output to any manner of external equipment operative to utilize a video signal, such as a display 16 on which the distortion corrected video signal 18 may be viewed. The image capture device 10 is operable to produce the distortion corrected video signal 18 by applying image transformations to the raw video signal 14 according to a calibration data table 22. The calibration data table 22 is automatically generated by the image processor 12, as will be described in detail herein.

In order to provide the raw video signal 14, the camera 11 of the image capture device 10 includes conventional camera components, such as a lens 26, a lens assembly 28, and an imager 30. The lens 26 is directed toward a field of vision 32, and focuses a beam of light 34 representing the field of vision 32. The beam of light 34 travels through the image capture device 10 along an optical axis 34a, and is conditioned by a lens assembly 28 which may include, for example, corrective lenses or zoom lenses. The lens assembly 28 directs the beam of light 34 onward to an imager 30, which is any element operative to provide the raw video signal 14 as either an analog or digital electrical signal. The imager 30 is electrically connected to the image processor 12 to provide the raw video signal 14 thereto. Of course, it should be understood that these elements are presented for purposes of explanation only, and the image capture device 10 may instead be provided with any suitable structures capable of providing the raw video signal 14 to the image processor 12.

The image processor 12 may be any manner of microprocessor and associated data storage medium, whether on-board or external. In order to create the distortion corrected video signal 18, the image processor 12 includes a distortion correction module 20 that applies corrective transformations to the raw video signal 14 on the basis of the calibration data table 22, as will be described in detail herein. In order to create the calibration data table 22, the image processor 12 includes a calibration module 24, which will also be described in detail herein.

In the image capture device 10, distortions are present in the raw video signal 14. For example, if the lens 26 is a wide-angle lens, a "fish eye" type distortion may be present in the raw video signal 14. Also, fabrication errors in the lens 26, the lens assembly 28 or the imager 30 may introduce distortions into the raw video signal 14. Additionally, misalignment of the lens 26, the lens assembly 28 and the imager 30 with respect to one another may introduce distortions into the raw video signal 14.

In order to calibrate the calibration data table 22 to compensate for the actual distortions present in the raw video signal 14 of a particular image capture device 10, the calibration data table 22 is created for each image capture device 10 individually. Generally stated, this is accomplished by capturing at least one calibration image 38 using the image capture device 10, and using the calibration module 24 of the image processor 12 to populate the calibration data table 22 with data describing the image transformations necessary to lessen the distortions present in the raw video signal 14, as shown in FIG. 2. As will be described in detail herein, the creation of the calibration data table 22 is accomplished by analyzing the calibration image 38 to calculate calibration image feature position data 39, and then analyzing the calibration image feature position data 39 to calculate the calibration data table 22.

Calibration of the image capture device 10 is performed during manufacturing of the image capture device 10 using a calibration station 40, as shown in FIG. 3A. The calibration station 40 may be one of a plurality of workstations (not shown) along an assembly line 42, and at least one test pattern 44 is disposed within the calibration station 44. It is contemplated that multiple test patterns 44 may be disposed within the calibration station 40, such that the test patterns 44 are all visible in a single calibration image 38, or alternatively, such that the image capture device 10 may produce a plurality of calibration images 38, each corresponding to a different test pattern 44. However, it should be understood that a single test pattern 44 could be provided at the calibration station 40, and multiple calibration images 38, if required for the particular calibration algorithm employed, could be produced by imaging the test pattern 44 from multiple locations.

The test patterns 44 may be any suitable pattern, geometric or otherwise, that can be interpreted using known machine vision technologies that are implemented in the calibration module 24. In particular, each test pattern 44 is provided with a plurality of features 45 that can be interpreted using known machine vision technologies, such as geometric shapes, lines, or boundaries between regions of contrasting colors, as shown in FIG. 3B. Furthermore it is contemplated that each test pattern 44 may be a grid of squares in a highly contrasting checkerboard pattern, wherein the squares are all of equal sizes to allow for geometric interpretation of each test pattern 44 by known methods that are implemented in the calibration module 24. In this case, the features 45 of each test pattern 44 may be the edges of each square of the test pattern, as well as the exterior corners of each test pattern 44. Of course, the features 45 may be provided in any type, number, or density as required.

In the calibration station 40, the image capture device 10 positioned so that at least one test pattern 44 is disposed within the field of vision 32 of the image capture device 10. The test pattern 44 or test patterns 44 need not be oriented in any particular manner with respect to the image capture device 10. However, it is contemplated that by disposing the image capture device 10 at a predetermined position and orientation with respect to one or more of the test patterns 44, the positions of the features 45 of the test pattern 44 will be similar to the positions of like features 45 depicted in a reference image 36 that is captured in advance using a different image capture device 10 from the same position and orientation, from which the reference image feature position data 37 is known. Thus, the reference image feature position data 37 may be stored in memory coupled to the image processor 12, and used by the image processor 12 to initially identify the general location of the test pattern 44 within the calibration image 38.

Figure 4:
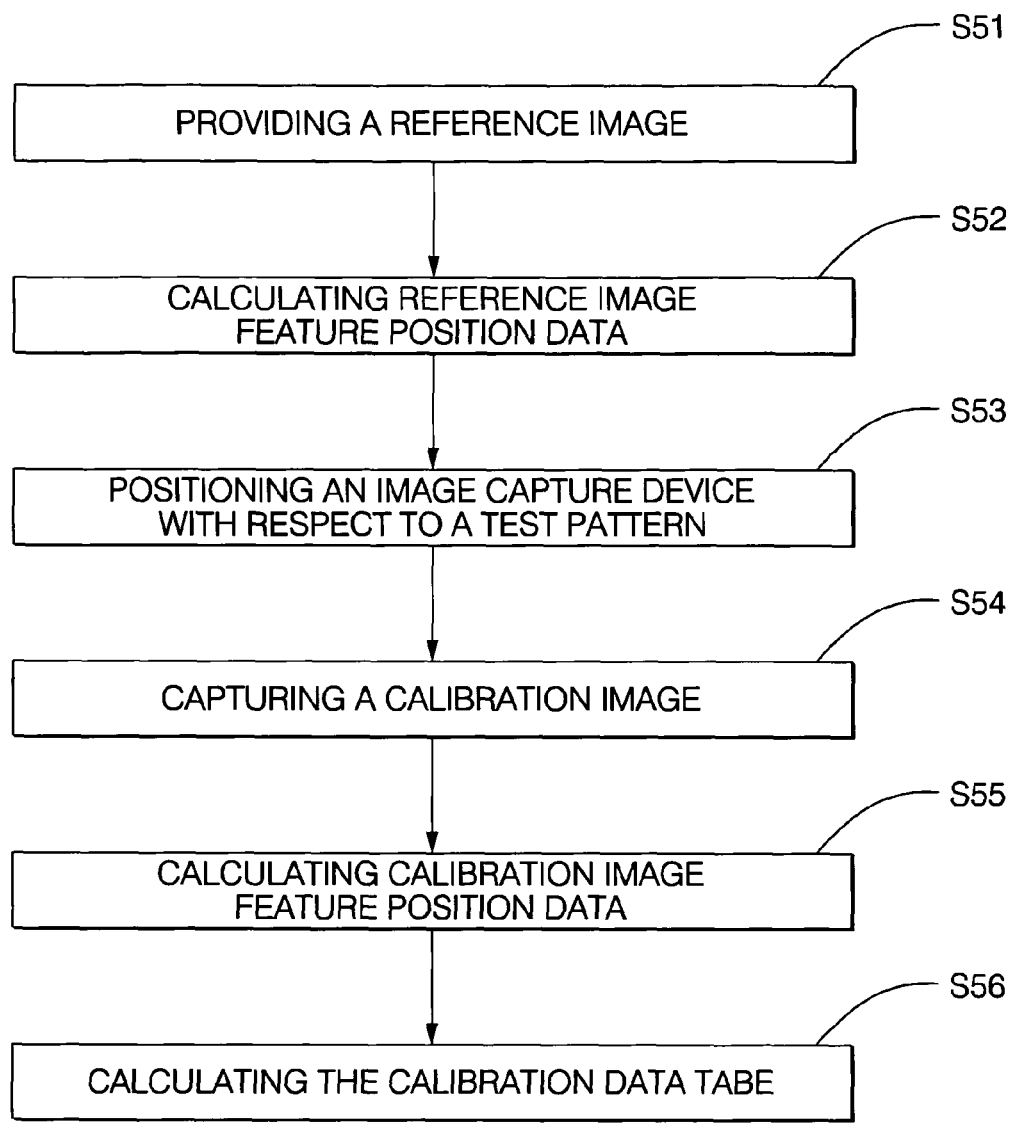
FIG. 4 is an illustration showing the calibration method for the image capture device.

Calibration of the image capture device 10 proceeds as shown in FIG. 4. In advance of calibration of the image capture device 10 at the calibration station 40, the reference image 36 may be provided in step S51 by imaging the test pattern 44. Then, also in advance of calibration, the reference image 36 is analyzed to define the locations of predetermined geometric features present in the reference image 36 and corresponding to the features 45 of the test pattern 44 in step S52, and the results are stored as the reference image feature position data 37, which may be stored in memory coupled to the image processor 12.

In step S53, the image capture device 10 is positioned in the calibration station 40 and directed toward one or more of the test patterns 44, for example, at a predetermined position with respect to the test pattern 44. Then, the image capture device 10 is placed into a calibration mode, and proceeds by capturing the calibration image 38 in step S54. In particular, the image capture device 10 is used to capture an image of the test pattern 44 from the raw video signal 14, and this image serves as the calibration image 38. Since the image capture device 10 is directed toward the test pattern 44 while at the calibration station 40, the test pattern 44 is visible in the calibration image 38. If multiple calibration images 38 are necessary, either of both of step S53 and S54 may be repeated as many times as desired.

In step S55, the calibration image 38 is analyzed by the calibration module 24 of the image processor 12 to calculate the calibration image feature position data 39. In particular, predetermined geometric features present in the calibration image 38 and corresponding to the features 45 of the test pattern 44 are identified using, for example, known machine vision technologies, and the results are stored as the calibration image feature position data 39. The calibration image feature position data 39 may be in any format capable of identifying a plurality of discrete portions of an image, such as mathematical descriptions of lines or points. Step S55 may utilize the reference image feature position data 37 to ensure accurate identification of the test pattern 44 in the calibration image 38 if the reference image feature position data was stored in the image processor 12 in step S52 and if the reference image 38 was captured in S54 with the image capture device 10 having previously been disposed in a predetermined position with respect to the test pattern 44 in step S53.

In step S56, the calibration data table 22 is computed by analyzing the calibration image feature position data 39 according to known properties of the test pattern 44 to determine the spatial deviation of the features 45 of the test pattern 44 in the calibration image 38 from the locations where the would be expected according to the known properties of the test pattern 44. For example, the once the image processor 12 has identified the corners of the test pattern 44 in the calibration image 38, the expected relative locations of each of the features 45 can be calculated mathematically, on which basis the spatial deviation of the features 45 of the test pattern 44 in the calibration image 38 from the locations where the would be expected according to the known properties of the test pattern 44 can be determined. On this basis, the calibration data table 22 is populated with data describing the necessary displacement of discrete portions, such as pixels, of the raw video signal 14 to create the distortion corrected video signal 18. Of course, the calibration data table 22 may comprise any conventional manner of data operable to describe spatial transformation of an image.

By way of example, the data elements in the calibration data table 22 may describe, for each pixel in the distortion corrected video signal 18, the locations of the pixel or pixels of the raw video signal 14 that are used to compose the corresponding pixel of the distortion corrected video signal 18, along with their relative weights. As an alternative example, the calibration data table 22 may include data describing one or more image transformations that may later be applied algorithmically to the raw video signal 14 or portions thereof.

After the calibration data table 22 has been generated, the raw video signal 14 of produced by the camera 11 may be processed using the distortion correction module 20 of the image processor 12 to provide the distortion corrected video signal 18. In particular, the data in the calibration data table 22 is used to transform the raw video signal 14, for example, on a pixel by pixel basis according to the instructions encoded within the calibration data table 22.

In use, a user wishing to calibrate the image capture device 10 positions the image capture device 10 at the calibration station 40, which may occur as the image capture device 10 travels along an assembly line 42 between a plurality of workstations. Once the image capture device 10 is positioned within the calibration station 40, the user instructs the image processor 12 of the image capture device 10 to enter a calibration mode, which causes the image processor 12 of the image capture device 10 to capture the calibration image 38 using the raw video signal 14 provided by the camera 11. Then, the calibration module 24 of the image processor 12 analyzes the calibration image 38 to produce the calibration data table 22. The calibration data table 22 is stored in the image processor 12 and subsequently used to process the raw video signal 14 to provide the distortion corrected video signal 18.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method for providing a distortion corrected video signal, comprising the steps of:
    providing at least one test pattern having a plurality of features disposed thereon;
    providing an image capture device having a camera and an image processor;
    capturing at least one calibration image of the test pattern using the camera;
    analyzing the at least one calibration image using the image processor to provide a calibration data table; and
    storing the calibration data table in the image processor, wherein the step of analyzing the at least one calibration image using the image processor to provide a calibration data table includes the steps of storing known geometric features of the least one test pattern in the image processor, identifying portions of the calibration image that correspond to the features of the test pattern to provide calibration image feature position data, and analyzing the calibration image feature position data based on the known geometric features of the at least one test pattern to provide the calibration data table.

2. The method of claim 1, further comprising the step of:
    positioning the image capture device within the calibration station at a predetermined location with respect to the test pattern.

3. The method of claim 1, further comprising the steps of:
    generating a raw video signal using the camera; and
    correcting the raw video signal using the image processor based on the calibration data table to provide a distortion corrected video signal.

4. A method for providing a distortion corrected video signal, comprising the steps of:
    providing a calibration station having at least one test pattern disposed therein;
    providing an image capture device having a camera and an image processor;
    storing reference image feature position data in the image processor, wherein the reference image feature position data describes the expected location of the at least one test pattern in an image;
    storing known geometric features of the least one test pattern in the image processor;
    positioning the image capture device within the calibration station at a predetermined location with respect to the test pattern;
    capturing at least one calibration image of the at least one test pattern using the camera;
    identifying portions of the at least one calibration image that correspond to the test pattern using the image processor and the reference image feature position data;
    analyzing the identified portions of the calibration image to identify portions of the calibration image that correspond to the features of the test pattern to provide calibration image feature position data;
    analyzing the calibration image feature position data using the image processor based on the known geometric features of the at least one test pattern to provide the calibration data table; and
    storing the calibration data table in the image processor.

5. The method of claim 4, further comprising the steps of:
    generating a raw video signal using the camera; and
    correcting the raw video signal using the image processor based on the calibration data table to provide a distortion corrected video signal.

* * * * *